US010003653B2

(12) United States Patent
Tincher (10) Patent No.: US 10,003,653 B2
(45) Date of Patent: Jun. 19, 2018

(54) WIRELESS INTERFACE MODULE FOR CHEMICAL DISPENSING SYSTEM

(71) Applicant: Delaware Capital Formation, Inc., Wilmington, DE (US)

(72) Inventor: Terry Tincher, Lebanon, OH (US)

(73) Assignee: Delaware Capital Formation, Inc., Wilmington, DE (US)

(\*) Notice: Subject to any disclaimer, the term of this patent is extended or adjusted under 35 U.S.C. 154(b) by 0 days. days.

(21) Appl. No.: 15/232,326

(22) Filed: Aug. 9, 2016

(65) Prior Publication Data

US 2017/0048325 A1 Feb. 16, 2017

Related U.S. Application Data

(60) Provisional application No. 62/204,703, filed on Aug. 13, 2015.

(51) Int. Cl.
*G08C 17/02* (2006.01)
*H04L 12/26* (2006.01)
(Continued)

(52) U.S. Cl.
CPC ........ *H04L 67/125* (2013.01); *A47L 15/4293* (2013.01); *A47L 15/44* (2013.01);
(Continued)

(58) Field of Classification Search
CPC .... A47L 15/4293; A47L 15/44; D06F 39/005; D06F 39/02; G05B 15/02; G05B 19/042;
(Continued)

(56) References Cited

U.S. PATENT DOCUMENTS

| 5,390,385 A | 2/1995 | Beldham |
| 2010/0161082 A1\* | 6/2010 | Ebrom ................... G05B 15/02 700/17 |

(Continued)

FOREIGN PATENT DOCUMENTS

| DE | 102007024496 A1 | 12/2007 |
| DE | 102011087274 A1 | 5/2013 |

(Continued)

OTHER PUBLICATIONS

European Patent Office, Extended Search Report in Corresponding European Application No. EP16001795.0, dated Jan. 18, 2017, 6 pages.

(Continued)

*Primary Examiner* — Dionne H Pendleton
(74) *Attorney, Agent, or Firm* — Wood Herron & Evans LLP (57) ABSTRACT

Methods, systems, and computer program products for wirelessly communicating with various system controllers of a facility through a wireless interface module. A mobile computing device may wirelessly connect with the wireless interface module to transmit information to and receive information from the wireless interface module. Specifically, a washing machine may be coupled to the system controller and may require various chemicals to perform the underlying washing tasks. As the chemicals are utilized, system controllers provide usage data and any other relevant data to the wireless machine interface, which may in turn provide the data to the mobile computing device upon request. Similarly, the mobile computing device may transmit system setting information, updated formulas, or other information to the wireless interface module for incorporation into one or more system controllers.

31 Claims, 7 Drawing Sheets

(51) Int. Cl.
*D06F 39/02* (2006.01)
*H04W 12/06* (2009.01)
*H04L 29/08* (2006.01)
*G05B 15/02* (2006.01)
*A47L 15/42* (2006.01)
*A47L 15/44* (2006.01)
*D06F 39/00* (2006.01)
*G06Q 30/06* (2012.01)
*G08B 21/18* (2006.01)
*H04L 29/12* (2006.01)
*H04W 84/12* (2009.01)

(52) U.S. Cl.
CPC ............ *D06F 39/005* (2013.01); *D06F 39/02* (2013.01); *G05B 15/02* (2013.01); *G06Q 30/0633* (2013.01); *G08B 21/182* (2013.01); *G08C 17/02* (2013.01); *H04L 43/10* (2013.01); *H04L 61/1594* (2013.01); *H04L 61/2038* (2013.01); *H04L 67/306* (2013.01); *H04W 12/06* (2013.01); *D06F 2204/02* (2013.01); *D06F 2204/08* (2013.01); *H04W 84/12* (2013.01)

(58) Field of Classification Search
CPC ...... G05B 19/0428; G05B 2219/23189; G05B 2219/24015; G05B 2219/24048; G05B 2219/24107; G05B 2219/2613; G05B 2219/2642; G06Q 30/0633; G06Q 10/0639; G06Q 10/105; G08B 21/182; G08C 17/02; H04L 43/10; H04L 61/1594; H04L 61/2038; H04L 67/125; H04L 67/306; H04L 41/22; H04L 67/10; H04W 12/06; H04W 4/008; H04W 4/14; H04W 4/16; H04W 68/00; B60L 11/182; B60L 11/1824; B60L 11/1848; G07C 3/00; H04M 19/047; H04M 1/7253; H04M 1/72533

See application file for complete search history.

(56) References Cited

U.S. PATENT DOCUMENTS

| | | |
|---|---|---|
| 2013/0098450 A1 | 4/2013 | Frantz |
| 2016/0036958 A1* | 2/2016 | Logan .................. G05B 19/042 455/414.1 |
| 2016/0072638 A1* | 3/2016 | Amer .................. H04L 12/2818 398/106 |
| 2016/0308686 A1* | 10/2016 | Vijayrao ............. H04L 12/2803 |

FOREIGN PATENT DOCUMENTS

| | | |
|---|---|---|
| DE | 102012217003 A1 | 3/2014 |
| DE | 102012223243 A1 | 6/2014 |
| EP | 2800079 | 11/2014 |

OTHER PUBLICATIONS

European Patent Office, Extended Search Report in EP Application No. EP17210137, dated Mar. 21, 2018, 6 pages.

* cited by examiner

WIRELESS INTERFACE MODULE FOR CHEMICAL DISPENSING SYSTEM

CROSS REFERENCE TO RELATED APPLICATION

Pursuant to 37 C.F.R. § 1.78 (a)(4), this application claims the benefit of and priority to prior filed Provisional Application Ser. No. 62/204,703 filed Aug. 13, 2015, which is expressly incorporated herein by reference. This application is also related to U.S. Pat. No. 8,956,579 that issued on Feb. 17, 2015, the disclosure of which is expressly incorporated herein by reference.

FIELD OF THE INVENTION

The disclosed invention generally relates to methods, systems, and computer program products for providing a wireless interface to a chemical dispensing system.

BACKGROUND OF THE INVENTION

The dispensing of liquid chemical products from one or more chemical receptacles is a common requirement of many industries, such as the laundry, textile, ware wash, healthcare instruments, and food processing industries. For example, in an industrial laundry facility or washing facility, one of several operating washing machines will require, from time to time, aqueous solutions containing quantities of alkaloid, detergent, bleach, starch, softener, and/or sour. Increasingly, such industries have turned to automated methods and systems for dispensing chemical products. Such automated methods and systems provide increased control of product use and reduce human contact with potentially hazardous chemicals.

Contemporary automatic chemical dispensing systems used in the commercial washing industry typically rely on pumps to deliver liquid chemical products from bulk storage containers. Generally, these pumps deliver raw product to a washing machine via a flush manifold, where the product is mixed with a diluent, such as water, that delivers the chemical product to the machine.

A typical chemical dispensing system used to supply a washing machine will include a system controller that is coupled to one or more peristaltic pumps in a pump-stand by a plurality of dedicated signal lines. The system controller will also typically be coupled to a washing machine interface by another plurality of dedicated signal lines, so that the system controller is provided with signals indicating the operational state of the machine. In operation, the machine interface transforms high voltage trigger signals generated by the washing machine into lower voltage signals suitable for the system controller, and transmits these low voltage trigger signals to the system controller over the set of dedicated signal lines, which are typically in the form of a multi-conductor cable. In response to these individual trigger signals, the controller will individually activate one or more of the pump-stands over another set of dedicated lines so that the pumps dispense a desired amount of a chemical product into the flush line. The chemicals are then mixed with a diluent before being delivered to the machine.

In contemporary automatic chemical dispensing systems, a user must physically access each system controller in order to retrieve reports, usage profiles, or any other system data. Likewise, the user must physically access each system controller in order to upload new system settings into the system controller. For example, if a user wishes to download a report or upload a new chemical usage formula, the user must insert one end of a data cable (e.g. a USB cable) into the system controller and the other end of the data cable into a computer to connect the two. Thereafter, the user may download the report or upload the new formula from a computer via the wired connection to the individual system controller. This represents an enormous time investment when a user or system administrator wishes to download a report or upload a formula, as the user must physically interact with each system controller for every washing machine in a facility.

Thus, improved systems, methods, and computer program products for providing a wireless interface to a chemical dispensing system are needed to streamline the transmitting of data between a user and any given washing machine or set of washing machines in a facility.

SUMMARY OF THE INVENTION

Methods, systems, and computer program products for wirelessly communicating with various system controllers of a facility through a wireless interface module. A mobile computing device may wirelessly connect with the wireless interface module to transmit information to and receive information from the wireless interface module. Specifically, a washing machine may be coupled to the system controller and may require various chemicals to perform the underlying washing tasks. As the chemicals are utilized, system controllers provide usage data and any other relevant data to the wireless machine interface, which may in turn provide the data to the mobile computing device upon request. Similarly, the mobile computing device may transmit system setting information, updated formulas, or other information to the wireless interface module for incorporation into one or more system controllers.

According to an embodiment, a method of managing a chemical dispensing system is disclosed. The method includes connecting a washing device to a wireless interface module to allow data communication therebetween. The method further includes communicating a first data wirelessly from a mobile computing device to the wireless interface module and communicating a second data from the wireless interface module to the washing device in response to the wireless interface module receiving the first data.

According to an embodiment, a system for managing a chemical dispensing system is disclosed. The system includes a processor and a non-transitory computer readable storage medium having computer program instructions stored thereon that, when executed by the processor, cause the system to perform a number of operations. A first operation includes connecting a washing device to a wireless interface module to allow data communication therebetween. As second operation includes communicating a first data wirelessly from a mobile computing device to the wireless interface module, and a third operation includes communicating a second data from the wireless interface module to the washing device in response to the wireless interface module receiving the first data.

Further embodiments, features, and advantages, as well as the structure and operation of the various embodiments, are described in detail below with reference to the accompanying drawings.

BRIEF DESCRIPTION OF THE DRAWINGS

The accompanying drawings, that are incorporated in and constitute a part of this specification, illustrate various embodiments of the invention and, together with the general description of the invention given above, and the detailed description of the embodiments given below, serve to explain the embodiments of the invention. Embodiments are described with reference to the accompanying drawings. In the drawings, like reference numbers may indicate identical or functionally similar elements.

DETAILED DESCRIPTION

Embodiments of the invention are directed to methods and systems for providing an interface module, gateway, server, system controller, or any other style of hierarchical control element for use with a chemical dispensing system. Embodiments of the invention may be implemented by a wireless interface module comprising one or more computers, servers, or networked components. The computer may include a wireless module or wireless input/output interface and may provide processing, control, database, reporting, and data transfer functions for a chemical dispensing system and modules that facilitate the transfer of chemicals such as cleaning chemicals or diluent fluids from one element in a facility to another. For example, the wireless interface module may be configured to facilitate the dispensing of cleaning chemicals from one or more storage containers to a washing machine in accordance with a stored formula or a product dispensing profile for a particular washing machine process.

Reference in this specification to "one embodiment," "an embodiment," an "example embodiment," etc., indicate that the embodiment described may include a particular feature, structure, or characteristic, but not every embodiment may necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one of ordinary skill in the relevant art to affect such feature, structure, or characteristic in connection with other embodiments whether or not explicitly described.

The following detailed description refers to the accompanying drawings that illustrate exemplary embodiments. Other embodiments are possible, and modifications can be made to the embodiments within the spirit and scope of this description. Those of ordinary skill in the relevant art with access to the teachings provided herein will recognize additional modifications, applications, and embodiments within the scope thereof and additional fields in which embodiments would be of significant utility. Therefore, the detailed description is not meant to limit the embodiments described below.

According to an embodiment, a user may access the wireless interface module wirelessly via a mobile computing device, such as a handheld phone, tablet computer, or laptop computer. Once a communication link is established between the mobile computing device and the wireless interface module through authentication of the user, data is passed therebetween. The wireless interface module may include a web server such that the interface to the wireless interface module provided to the mobile computing device may be a web-based interface using HTML or any other style web software or programming language.

In an embodiment of the invention, the wireless interface module may connect to at least one system controller located in a washing facility and associated with a particular washing machine. According to an embodiment, the system controller may be implemented in hardware, software, or firmware, as described in greater detail below. The wireless interface module may poll the system controller for data relating to the washing machine status, functionality, or general usage of system resources such as chemicals or power.

According to an embodiment, the wireless interface module may interrogate each connected controller periodically. In an embodiment, the interface module may interrogate each connected controller roughly once every 5 seconds. In further embodiments, the interface module may interrogate one or more connected controllers at different time intervals. The wireless interface module may extract system controller data logs from the local memory location of each controller. The wireless interface module may then parse the data to determine relative changes based on the last interrogation. The wireless interface module may use this data to format the chemical management page of the wireless system webpage dashboard with the latest product status information. The dashboard may include multiple web pages of information including any diagnostic information, connectivity status, current formulas being executed, and sensor information. The data may include information regarding power failures.

The wireless interface module may further provide the collected data, in a raw format or a refined format, to the mobile computing device upon request. Further, the wireless interface module may transmit updated usage profile information, chemical formulas, or system setting information to the system controller for incorporation by the wireless interface module. The updated information may be provided by the mobile computing device to the wireless interface module, either by manipulating or entering setting information on a local interface of the mobile computing device or by transmitting a file containing the updated information from the mobile computing device to the wireless interface module.

In an embodiment of the invention, the wireless interface module is configured to poll each system controller connected to the wireless interface module to determine the amount of chemical fluid consumed in a given time frame, either individually by each washing machine or globally by the overall chemical dispensing system. A user or operator may set a given threshold level for a particular chemical fluid or any other resource in the system and alert an interested party when the amount of chemical approaches or breaches the set threshold. The wireless interface module may be configured to automatically order the particular chemical from the supplier and update the quantity information stored in wireless interface module upon arrival of additional chemical fluid.

The wireless interface module may be configured to connect directly to a system controller through a dedicated discrete data transmission wire as well as through a serial daisy-chained number of system controllers. In the daisy-chain setup, each system controller receives an assigned software address for use by the wireless interface module in directly addressing any system controller in the chain. Such a configuration may be implemented for devices having a serial port. For a system including devices not having a serial port, the wireless interface may identify each controller via a discrete cable connected port. An individual TE controller's connectivity status may be interrogated by the wireless interface module. According to an embodiment, a local light emitting diode (LED) on the wireless interface unit front panel may be used to provide visual confirmation of a good connection of each controller that is physically attached.

The wireless interface module may include an IP address that may be manually changed or updated by an administrator of the underlying chemical dispensing system. Alternatively, the wireless interface module may be dynamically assigned an IP address using DHCP or any other addressing protocol. The wireless interface module may include a WiFi module for generating a wireless signal and facilitating a wireless local area network (WLAN). The WLAN may transmit a particular service set identifier (SSID) in order for the user of the mobile computing device to log into the WLAN and communicate with the wireless interface module. Inasmuch as interaction with the wireless interface module may be intermittent, the WiFi module may be placed in a low power mode for the long periods of inactivity of the given environment.

The wireless interface module may be configured to receive information regarding the amount of each chemical in the chemical dispensing system and thereafter poll each system controller to determine the amount of chemical used by the underlying washing machine. The wireless interface module may thereafter aggregate the data from each system controller to track the amount of any given chemical remaining in the chemical dispensing system. Once a particular chemical falls below a set threshold level (which is settable via the web browser interface), the wireless interface module may alert any interested parties such as a facility administrator or may take steps to electronically request or order the particular chemical from an offsite warehouse or a third-party vendor. These notifications, request, or orders may take the form of text messages, electronic mail messages, or automatically generated faxes or pre-recorded phone calls.

The wireless interface module may be configured to detect AC line voltage brownouts and act accordingly to preserve system data. Further, the wireless interface module may interface with various sensors such as a low level advisor to provide a record of an event and to provide a notification. The notification may be sent locally or remotely to any interested parties (which is configurable in the setup menu page of the system dashboard). Still further, the wireless interface controller may be configured to halt system controllers for any trigger events such as a particular chemical falling below a set threshold.

Figure 1:
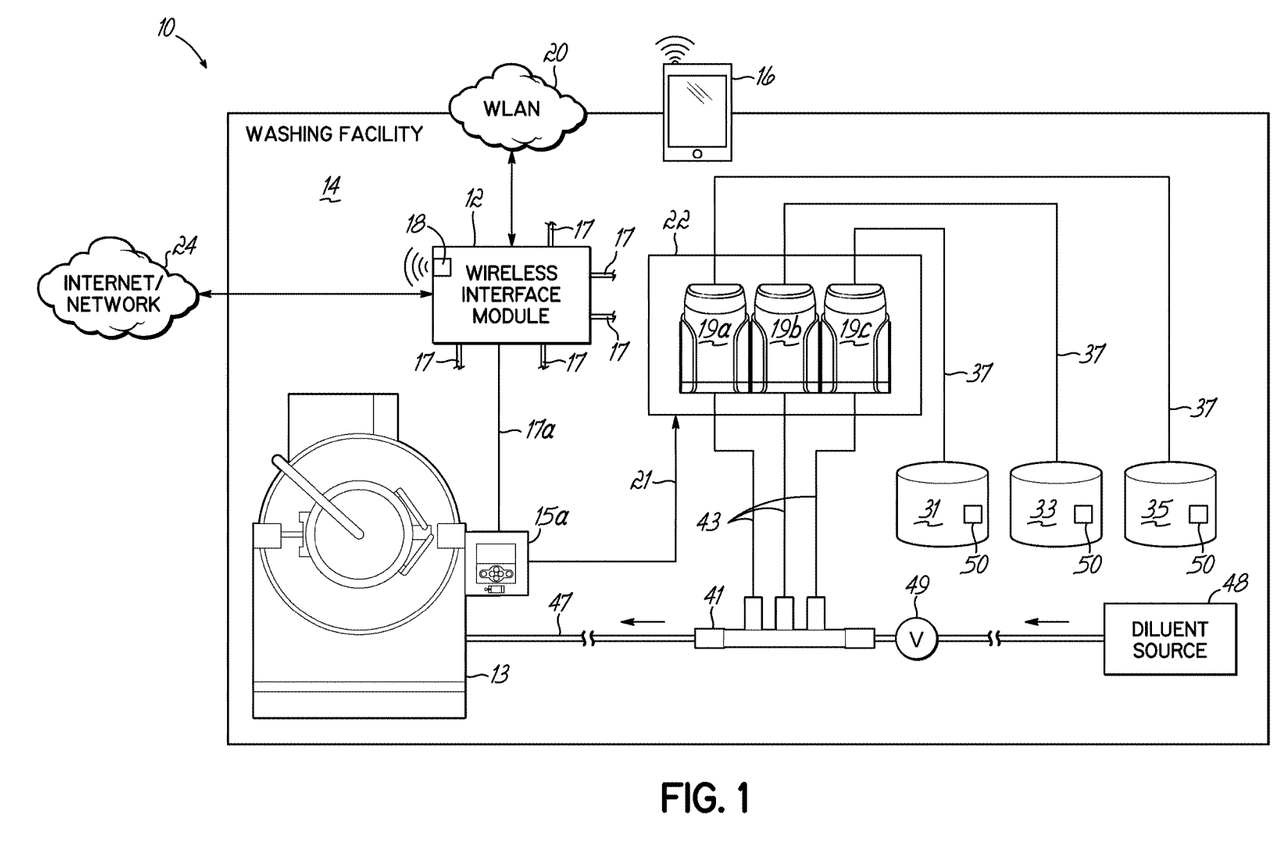
FIG. 1 is a diagrammatic view of an exemplary chemical dispensing system including a mobile computing device in communication with a wireless interface module via a wireless local area network.

Referring now to FIG. 1, chemical dispensing system 10 in accordance with an embodiment of the invention may include a wireless interface module 12. Wireless interface module 12 may be deployed at a washing facility 14 to communicate with one or more washing machines 13, each of which may be a laundry machine, a ware-wash machine, a healthcare washing machine, or any other type of machine that uses dispensed chemicals. One washing machine 13 is shown in FIG. 1 only for clarity as wireless interface module 12 is configured to communicate with multiple washing machines 13.

In general, the wireless interface module 12 operates to interface with elements of washing facility 14 either through wired communication or wireless communication. Chemical dispensing system 10 may further include a mobile computing device 16 which may be in the form of a phone, tablet, or laptop computer. The wireless interface module 12 and the mobile computing device 16 may communicate with each as two nodes on a network. The communication may be facilitated through a WiFi module 18 disposed in the wireless interface module 12. Through WiFi module 18, the wireless interface module 12 may create a wireless WLAN 20 broadcasting an SSID. To initiate the exchange of data between wireless interface module 12 and mobile computing device 16, a user of the mobile computing device 16 selects the SSID and proceeds to log into the WLAN using a username and password. The initializing of the connection between the wireless interface module 12 and the mobile computing device 16 may be through a webpage served from the wireless interface module 12 to the mobile computing device 16. Once the mobile computing device 16 is authenticated to use WLAN 20, a wireless communication link is established between the wireless interface module 12 and the mobile computing device 16 and data may thereafter be passed therebetween as necessary. Wireless interface module 12 may also communicate with a network 24, which may be facilitated by a cellular card 45 (FIG. 3) or a network interface controller (not shown) disposed in wireless interface module 12. By way of cellular card 45 or network interface controller, wireless interface module 12 may include remote access capabilities, whereby a user may log into the wireless interface module 12 over the internet. As such, wireless interface module 12 may provide remote access to an authenticated user over an internet connection. Further, wireless interface module may provide a web browser application including information regarding type and status of user connections and a visual indicator that provides a visual indication of connection quality.

Each washing machine 13 in chemical dispensing system 10 may be coupled with a dedicated system controller 15, shown in FIG. 1 as system controller 15a. Each system controller 15 may communicate with wireless interface module 12 by way of a direct data link 17. As shown in FIG. 1, system controller 15a may communicate with wireless interface module 12 by way of data link 17a. Each system controller 15 may also be coupled to a plurality of pumps 19a-19c, comprising a pump stand 22, by a data link 21. Data link 17 may also include a power line incorporated therein or a power line (not shown) may be provided separately, extending from each system controller 15 to wireless interface module 12.

In an embodiment of the invention, one or more of the system controllers 15 may also or alternatively include a wireless module (not show) for facilitating wireless communication between the particular system controller 15 and the wireless interface module 12. In this embodiment, each wireless system controller 15 is paired or authenticated with the wireless interface module 12 to create a wireless communication link between the wireless system controller 15 and the wireless interface module 12. This configuration allows the washing machine 13 associated with the wireless system controller 15 to be positioned in areas of the washing facility 14 that may not have a convenient orientation for direct wired connection with the wireless interface module 12. Likewise, other washing machines 13 may be located near, but not in the washing facility 14 while still communicating with the wireless interface module 12 over a wireless connection. For example, a single washing machine 13 may be spaced apart from the washing facility 14 in a janitor office or similar. In this embodiment, the janitor's washing machine 13 may be wirelessly coupled to the wireless interface module 12 while the washing machines 13 inside the washing facility 14 may be physically coupled to the wireless interface module 12 via data link 17. This configuration allows a user or administrator to configure the washing machine in the janitor office without extending a data link 17 over a long distance.

For illustrative purposes, FIG. 1 shows chemical dispensing system 10 with three pumps 19a-19c. However, it is understood that other numbers of pumps may be used, and the invention is not limited to any specific number of pumps. To obtain data concerning the operational status of the washing machine 13, each system controller 15 is coupled to a machine interface (not shown) by a machine interface serial data bus (not shown). Typically, each system controller 15 will be located near (or mounted to) the associated washing machine 13 as shown in FIG. 1, but each system controller 15 may also be located remotely from the associated washing machine 13.

The pump-stand 22 is configured to provide product to the washing machine 13 from various chemical storage containers 31, 33, 35, each of which is fluidically coupled to one of pumps 19a-19c by a product supply line 37. Typically, the output of each pump 19a-19c is fluidically coupled to a flush manifold 41 by flush manifold supply lines 43 as shown in FIG. 1. However, the pumps 19a-19c may also be fluidically coupled directly to the washing machine 13 so that undiluted product is delivered to the machine 13. In embodiments including the flush manifold 41, an output of the flush manifold 41 is coupled to the washing machine 13 by a machine supply line 47, and an input of the flush manifold 41 is coupled to a diluent source 48 by a diluent valve 49. The diluent valve 49 may be electrically coupled to one or more of the pumps 19a-19c, so that the chemical dispensing system 10 can control delivery of product to the washing machine 13 by regulating the flow of diluent through the flush manifold 41. According to an embodiment, the flush manifold may further include one or more sensors that are configured to provide dispenser control feedback and to provide product delivery verification information.

Some embodiments of the invention may also include probe assemblies 50 operatively disposed in containers 31, 33, 35. The probe assemblies 50, in turn, may be electrically coupled to a detection circuit (not shown) in the pump 19a-19c that dispenses product from the container 31, 33, 35 in which the probe assembly 50 is located. Probe assemblies 50 may be configured to provide a signal to the detection circuit indicative of the level of product in the container 31, 33, 35 so that the pumps 19a-19c may monitor product levels in their associated containers 31, 33, 35. Probe assemblies 50 may include one or more conductive probes that present different impedances to the detection circuit depending on whether the probe assembly 50 is in contact with product. Suitable probe assembles and detection circuits are described in U.S. patent application Ser. No. 13/164,878, entitled "System and Method for Product Level Monitoring in a Chemical Dispensing System," the disclosure of which is incorporated herein by reference in its entirety. Conductive, Optical, and temperature probes can be added to the output of the flush manifold 41 to verify the status of product delivery or be used in conjunction with the dispensing operation, as described above.

Figure 2:
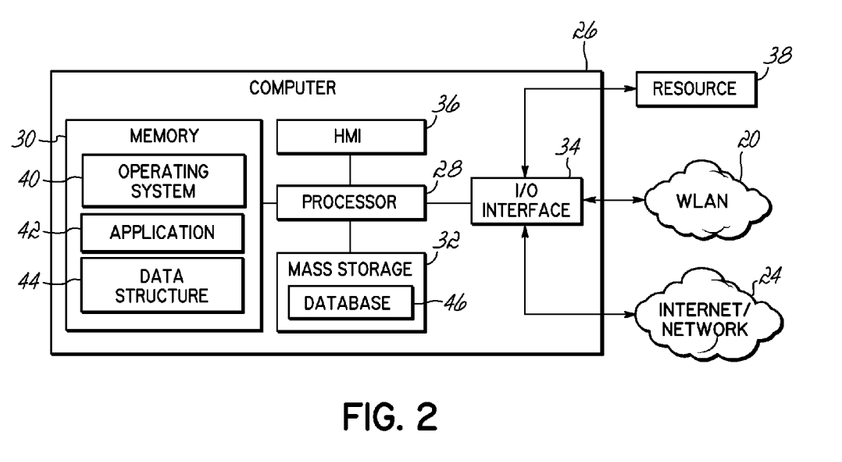
FIG. 2 is a diagrammatic view of an exemplary computer system of FIG. 1.

Referring now to FIG. 2, wireless interface module 12, each system controller 15, and mobile computing device 16 of chemical dispensing system 10 may be implemented on one or more computing devices or systems, such as exemplary computer system 26. The computer system 26 may include a processor 28, a memory 30, a mass storage memory device 32, an input/output (I/O) interface 34, and a Human Machine Interface (HMI) 36. The computer system 26 may also be operatively coupled to one or more external resources 38 via the network 24 or I/O interface 34. External resources may include, but are not limited to, servers, databases, mass storage devices, peripheral devices, cloud-based network services, or any other suitable computer resource that may used by the computer system 26.

The processor 28 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 30. Memory 30 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 32 may include data storage devices such as a hard drive, optical drive, tape drive, non-volatile solid state device, or any other device capable of storing information.

Processor 28 may operate under the control of an operating system 40 that resides in memory 30. The operating system 40 may manage computer resources so that computer program code embodied as one or more computer software applications, such as an application 42 residing in memory 30, may have instructions executed by the processor 28. In an alternative embodiment, the processor 28 may execute the application 42 directly, in which case the operating system 40 may be omitted. One or more data structures 44 may also reside in memory 30, and may be used by the processor 28, operating system 40, or application 42 to store or manipulate data.

The I/O interface 34 may provide a machine interface that operatively couples the processor 28 to other devices and systems, such as the network 24 or external resource 38. The application 42 may thereby work cooperatively with the network 24 or external resource 38 by communicating via the I/O interface 34 to provide the various features, functions, applications, processes, or modules comprising embodiments of the invention. The application 42 may also have program code that is executed by one or more external resources 38, or otherwise rely on functions or signals provided by other system or network components external to the computer system 26. Indeed, given the nearly endless hardware and software configurations possible, persons having ordinary skill in the art will understand that embodiments of the invention may include applications that are located externally to the computer system 26, distributed among multiple computers or other external resources 38, or provided by computing resources (hardware and software) that are provided as a service over the network 24, such as a cloud computing service.

The HMI 36 may be operatively coupled to the processor 28 of computer system 26 in a known manner to allow a user to interact directly with the computer system 26. The HMI 36 may include video or alphanumeric displays, a touch screen, a speaker, and any other suitable audio and visual indicators capable of providing data to the user. The HMI 36 may also include input devices and controls such as an alphanumeric keyboard, a pointing device, keypads, push-buttons, control knobs, microphones, etc., capable of accepting commands or input from the user and transmitting the entered input to the processor 28.

A database 46 may reside on the mass storage memory device 32, and may be used to collect and organize data used by the various systems and modules described herein. The database 46 may include data and supporting data structures that store and organize the data. In particular, the database 46 may be arranged with any database organization or structure including, but not limited to, a relational database, a hierarchical database, a network database, or combinations thereof. A database management system in the form of a computer software application executing as instructions on the processor 28 may be used to access the information or data stored in records of the database 46 in response to a query, where a query may be dynamically determined and executed by the operating system 40, other applications 42, or one or more modules. In an embodiment of the invention, the database 46 may include information regarding usage statistics for each chemical in the chemical dispensing system 10, usage information regarding each system controller 15, system setting information, or any combination thereof, or any other information relevant to the operation of chemical dispensing system 10

Figure 3:
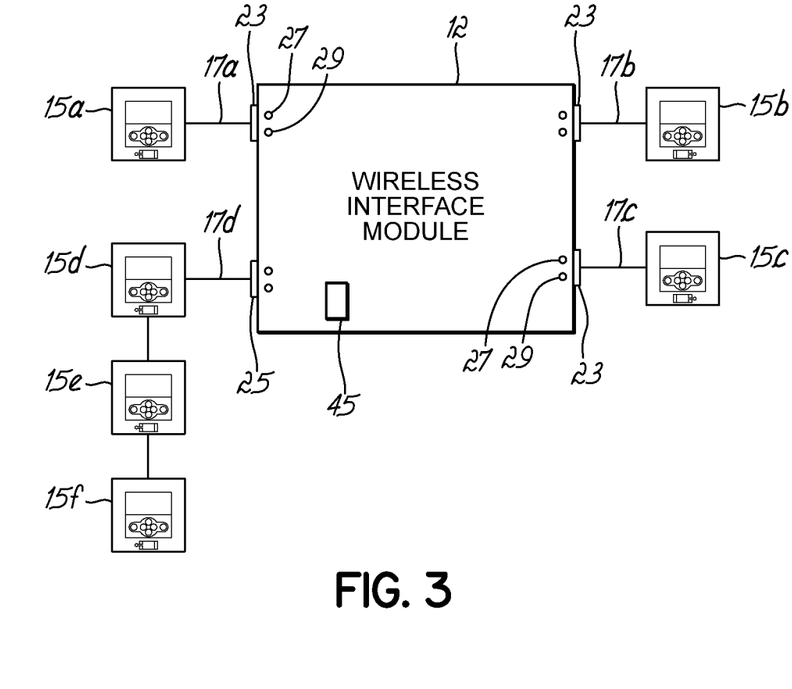
FIG. 3 is a schematic view of wireless interface module with a plurality of system controllers connected thereto.

Referring now to FIG. 3, wireless interface module 12 may include multiple ports for communicating with system controllers 15. Wireless interface module 12 may connect to a particular system controller 15 through a discrete wired channel, such as illustrated by system controller 15a and data link 17a. Inasmuch as data link 17a is a direct discrete channel between wireless interface module 12 and system controller 15a, no software enumeration is required on those system controllers 15 having a direct data link 17 as each system controller 15 is directly electronically accessible to wireless interface module 12. Conversely, system controllers 15 may be daisy chained together through one channel that addresses all of the system controllers 15 in the chain, as illustrated by system controller 15d and data links 17d. In an embodiment of the invention, each system controller 15 connected in serial to wireless interface module 12 is assigned a software address and is thereafter accessed by wireless interface module 12 through the software address. In an embodiment of the invention, wireless interface module 12 includes one or more serial ports 25 dedicated and configured to provide a serial daisy-chain style communication to associated software addressed system controllers 15 and one or more direct ports 23 dedicated and configured to provide direct access style communication to a single controller 15. Inasmuch as no software enumeration is required for direct access system controllers 15, in an embodiment of the invention, at least one of the system controllers 15 configured to utilize one of the direct ports 23 is loaded with a real-time operating system for coordinating and facilitating the timing and scheduling of communication with wireless interface module 12 and to minimize interrupt and communication latency.

As shown in FIG. 3, wireless interface module 12 may include a feedback element for providing visual indication of the usage of wireless interface module 12 and the associated ports 23 and ports 25. In an embodiment of the invention, wireless interface module 12 includes light-emitting diodes (LEDs) such that each port is situated proximate a first LED 27 and a second LED 29. In an embodiment of the invention, the first LED 27 will illuminate when a system controller 15 is connected and power is being supplied from the system controller 15 to the wireless interface module 12. Thus, visual feedback is provided through LED 27 regarding whether power is flowing from the associated system controller 15 to the wireless interface module 12. If an administrator or user observes that a particular system controller 15 is connected to wireless interface module 12, yet LED 27 is not illuminated, the user will readily understand that power is not flowing from the system controller 15 to wireless interface module 12.

Similarly, second LED 29 may illuminate when a system controller 15 is communicating to wireless interface module 12 over the associated port and data link 17. In an embodiment of the invention, second LED 29 may illuminate only when the user selects the particular system controller 15 on the mobile computing device 16 and wireless interface module 12 is communicating with the selected system controller 15. Alternatively, second LED 29 may flicker in accordance with data flow between system controller 15 and wireless interface module 12.

Figure 4:
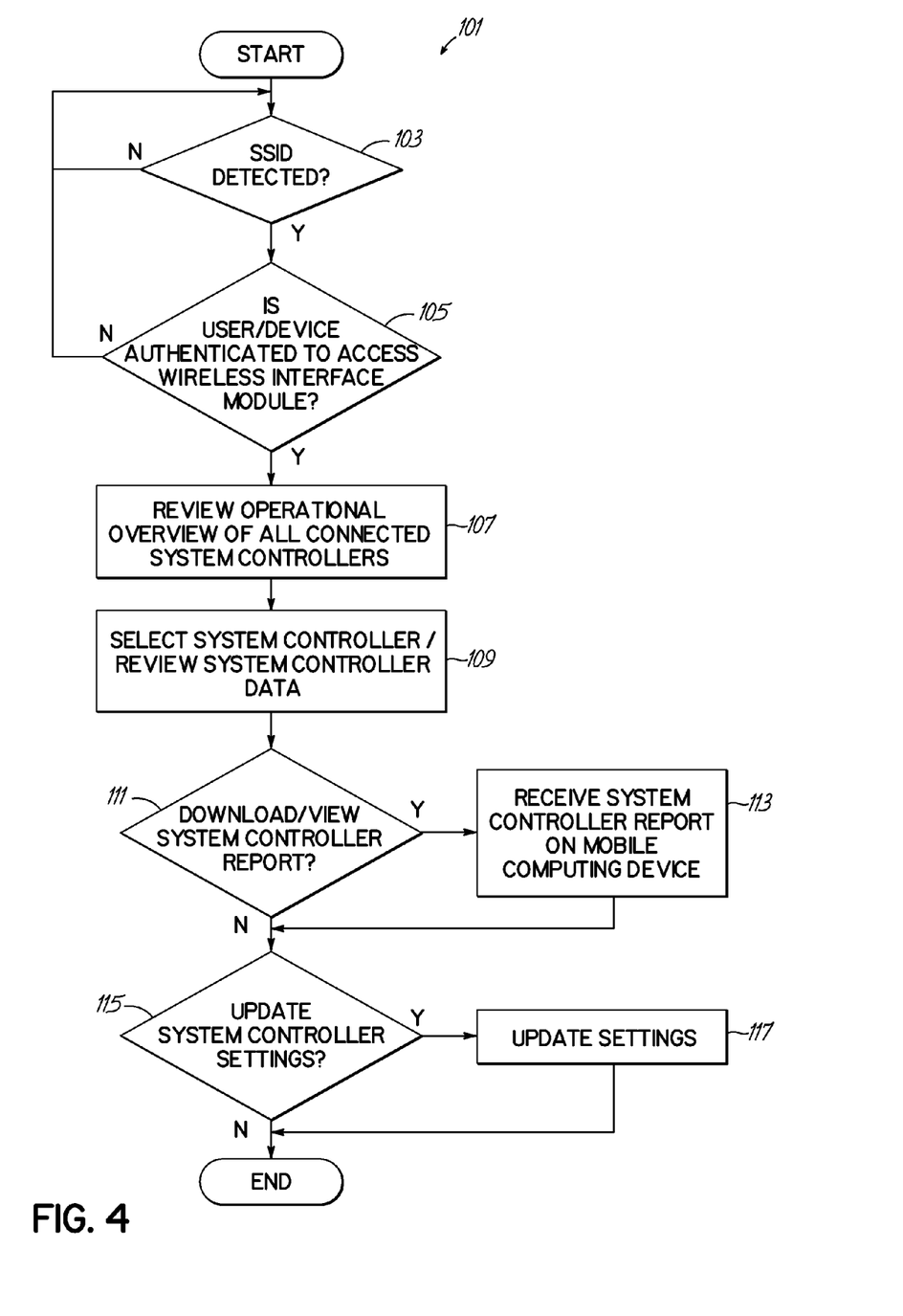
FIG. 4 is a flowchart of a communication process that may be performed by the mobile computing device and wireless interface module of FIG. 1.

Referring now to FIG. 4, an embodiment of the invention includes a process 101. Process 101 begins with a step 103 wherein mobile computing device 16 attempts to connect to wireless interface module 12 by searching for an SSID. If an SSID is detected, step 103 proceeds to a step 105. If step 103 cannot detect an SSID, possibly because mobile computing device 16 is outside the range of WLAN 20, step 103 loops back to continue searching for an SSID. In step 105, wireless interface module 12 attempts to authenticate mobile computing device 16 on WLAN 20. In an embodiment of the invention, wireless interface module 12 serves a login webpage to mobile computing device 20 and prompts the user to enter an alpha-numeric user identifier and an alpha-numeric password. Upon entry of user identifier and password, the user actuates a button on the webpage to push the information back to the wireless interface module 12. Thereafter, if the user identifier and password is valid, the mobile computing device 16 is authenticated to communicate with wireless interface module 12 over WLAN 20. If the user identifier and password is not valid, step 105 proceeds back to step 103 or may alternative provide a set number of chances for the user to enter the correct information before proceeding back to step 103. Cellular card 45 or networking interface controller may similarly be used to serve a login webpage to a user via remote access over the internet. Thus, an authenticated user may interact with wireless interface module 12 from anywhere over an internet connection.

If the user/mobile computing device 16 is authenticated to communicate with wireless interface module 12 through WLAN 20, step 105 proceeds to a step 107. In step 107, the mobile computing device 16 receives overview information regarding all of the controllers connected to wireless interface module 12. This information may be customized and associated with the user identifier such that each unique user is provided with the desired information regarding the connected system controllers. As described previously, this information is collected by wireless interface module 12 and accumulated and stored for access by mobile computing devices 16. After the overview information regarding all of the controllers is presented to the user on mobile communication device 16, step 107 proceeds to a step 109.

In step 109, a user selects a particular system controller for further inquiry and focus. In an embodiment of the invention, a list of the available system controllers is provided to the user on a web page served to and visible on the mobile computing device 16 with a selection box proximate each system controller in the list. The user selects the box proximate the chosen system controller and submits the web page to the wireless interface module 12. Once a system controller is selected and the selection is provided to wireless interface module 12, step 109 proceeds to a step 111. The web page may further include a drop down menu of individual controllers enabling a user to select a controller and to view current operations and to change selective parameters associated with the selected controller.

In step 111, the user is prompted or provided with a web interface option to download or view a report available regarding the selected system controller. If the user wants to download or view the report, the user actuates a "yes" button on the web interface or provides a similar affirmative response and step 111 proceeds to a step 113. If the user does not wish to download or view the report, step 111 proceeds to a step 115. In step 113, the report is transmitted wirelessly from wireless interface module 12 to mobile computing device 16, either for the user to simply view the report or to acquire the report in digital format for later use. For example, a PDF of the report may be transmitted to the mobile computing device. Thereafter, step 113 proceeds to step 115.

In step 115, the user is prompted or provided with a web interface option to update the settings of the selected system controller. By updating the settings, the user can alter chemical formulas or durations of time for certain events controlled by the system controller. If the user wants to update the settings, the user actuates a "yes" button on the web interface or provides a similar affirmative response and step 115 proceeds to a step 117. If the user does not wish to update the settings of the selected system controller, process 101 ends. In step 117, the user enters updated setting for the selected system controller and provides these settings to wireless interface module 12. In an embodiment of the invention, the user may actuate various settings for the system controller provided through a web interface over WLAN 20 such as an input box for entering various numerical variables. In another embodiment of the invention, the user pushes or provides a file containing the updated settings to wireless interface module 12 over WLAN 20. After the user provides updated settings for the system controller in step 117, process 101 ends.

Figure 5:
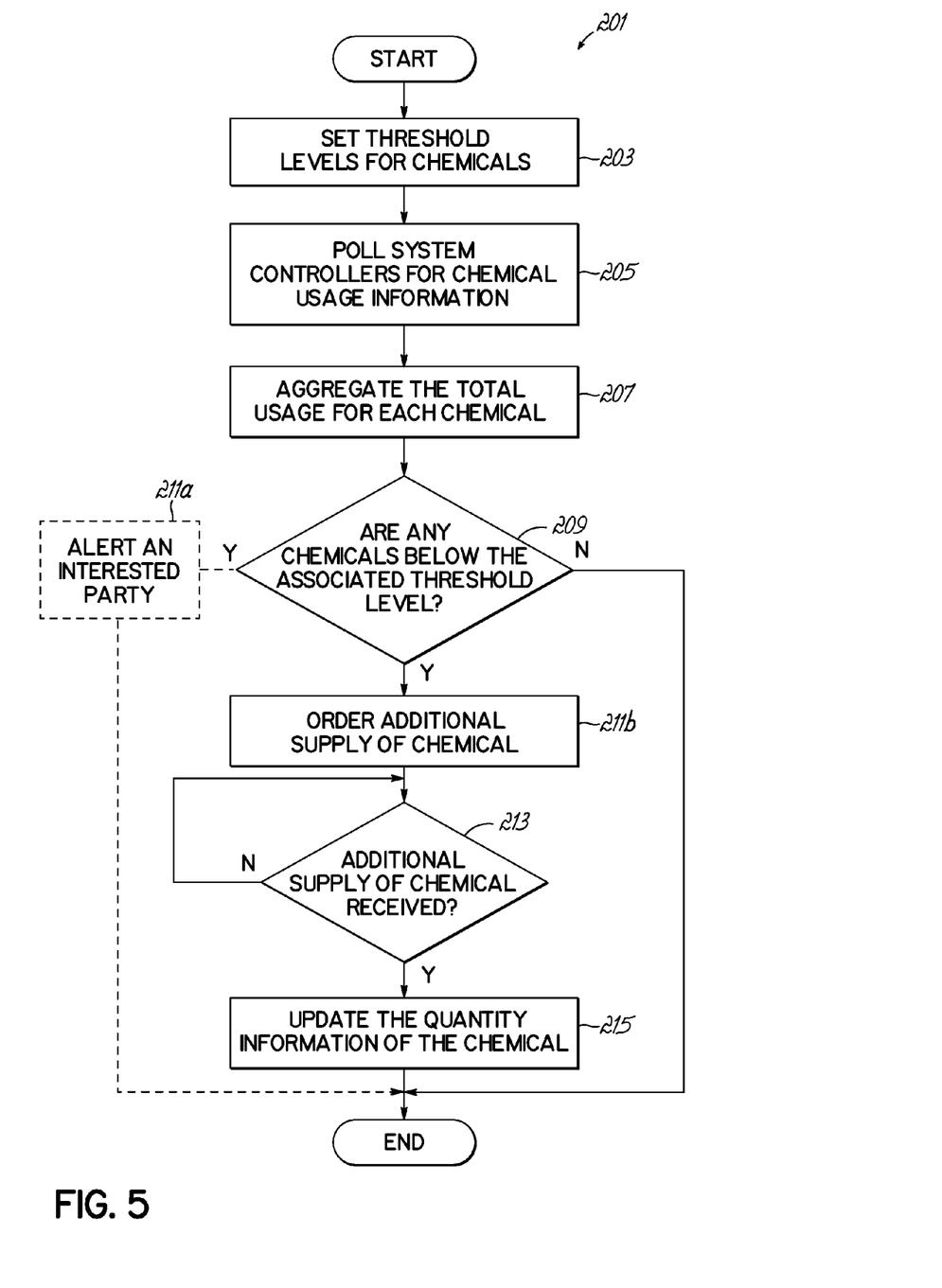
FIG. 5 is a flowchart of a threshold detection process that may be performed by the mobile computing device and wireless interface module of FIG. 1.

Referring now to FIG. 5, an embodiment of the invention includes a process 201. Process 201 begins with a step 203 where a user or administrator of either washing facility or wireless interface module 12 sets a threshold level for each chemical used by chemical dispensing system 10. The wireless interface module may automatically populate the webpage dashboard with new chemicals (and their status) when the user adds new formulas and chemical products to the individual dispensing system as required. For example, in FIG. 1, the chemical disposed in container 31 may have a first threshold level of 10 gallons, the chemical disposed in container 33 may have a second threshold level of 12 gallons, and the chemical disposed in container 35 may have a third threshold level of 18 gallons. After a threshold value is set for each chemical in chemical dispensing system 10, step 203 moves to a step 205. In step 205, wireless interface module 12 polls each system controller 15 connected thereto for information regarding usage of the underlying chemicals. For example, system controller 15a may transmit data revealing that the controller used 1.2 gallons of the chemical found in container 31 since the last request by wireless interface module 12 for this data. After wireless interface module 12 has collected usage information or reports from each system controller 15, step 205 proceeds to a step 207. In step 207, the total usage for each chemical for each system controller 15 is aggregated into a value that reflects the total amount of each chemical used by chemical dispensing system 10. Step 207 thereafter proceeds to a step 209, where process 201 determines whether any chemical in dispensing system 10 is at or below the associated threshold level for that particular chemical.

This information is derived by wireless interface module 12 by comparing the last known quantity of the chemical with the aggregated usage data most recently collected. If the last known quantity of the chemical minus the amount of chemical used in the aggregate is below the threshold, step 209 determines that a threshold level is breached for the chemical. For example, if the threshold level for "Chemical A" is 1.2 gallons and wireless interface module 12 determines only 0.8 gallons of Chemical A remain in chemical dispensing system, wireless interface module 12 recognizes that the threshold level for Chemical A has been breached by the amount of 0.4 gallons. If step 209 determines a threshold level has been breached, step 209 proceeds to either a step 211a or a step 211b, depending on the preference settings or system configuration of the underlying wireless interface module 12. If step 209 determines none of the threshold levels have been breached, process 201 ends.

Step 211a presumes a list of interested parties, along with associated contact information such as an email address is compiled and entered into wireless interface module 12. As such, when step 209 determines a threshold level is breached, step 211a notifies each party in the list of interested parties with relevant information regarding the breach of a threshold. For example, interested parties may be provided with the chemical name, the threshold value, and the total remaining quantity of the chemical. For example, if the list of interested parties includes a text message address of a system administrator of chemical dispensing system 10, when a given chemical falls below the associated threshold, a text message is sent to the system administrator alerting him or her that the chemical is below the threshold, the threshold amount, and amount of the chemical currently remaining in chemical dispensing system 10. Upon receipt of the alert, the interested parties are empowered to take any necessary steps to rectify the situation, including ordering more chemical from a supplier or any other method of increasing the chemical in chemical dispensing system above the threshold.

As discussed above, step 209 may alternatively proceeds to step 211b. In step 211b, wireless interface module 12 may be configured to automatically order or procure the particular chemical that has fallen below the threshold level. This scenario necessitates the input of certain vendor information into the memory of wireless interface module 12 as well as associating each chemical with a vendor. For example, if Chemical A falls below the associated threshold level, wireless interface module 12 may retrieve the relevant information regarding procurement of Chemical A from "Vendor A" and automatically generate a purchase order for Chemical A. Thereafter, wireless interface module 12 may automatically email, fax, text message, or otherwise transmit the generated purchase order to Vendor A. Wireless interface module 12 may be configured to accomplish step 211b seamlessly behind the scenes such that minimal interaction or knowledge is required by the users or administrators of chemical dispensing system 10 when a chemical falls below the given threshold levels. After step 211*b* orders an additional supply of the chemical, step 211*b* proceeds to a step 213.

In step 213, process 201 determines whether the additional supply of the chemical has been received at washing facility 14. If the supply of chemical has been delivered/received, step 213 proceeds to a step 215. If the supply of chemical has not been received, step 213 repeats itself such that process 201 waits until the chemical arrives. In step 215, the quantity of the chemical is entered into wireless interface module 12 and the associated accumulator value for the chemical is reset and updated such that the value for the chemical in wireless interface module 12 reflects the current updated quantity. This operation may be manually performed in its entirety by a user or administrator of chemical dispensing system 10, or may be partially automated by scanning a bar code with quantity information, or any other similar operation. Thereafter, process 201 ends.

Figure 6:
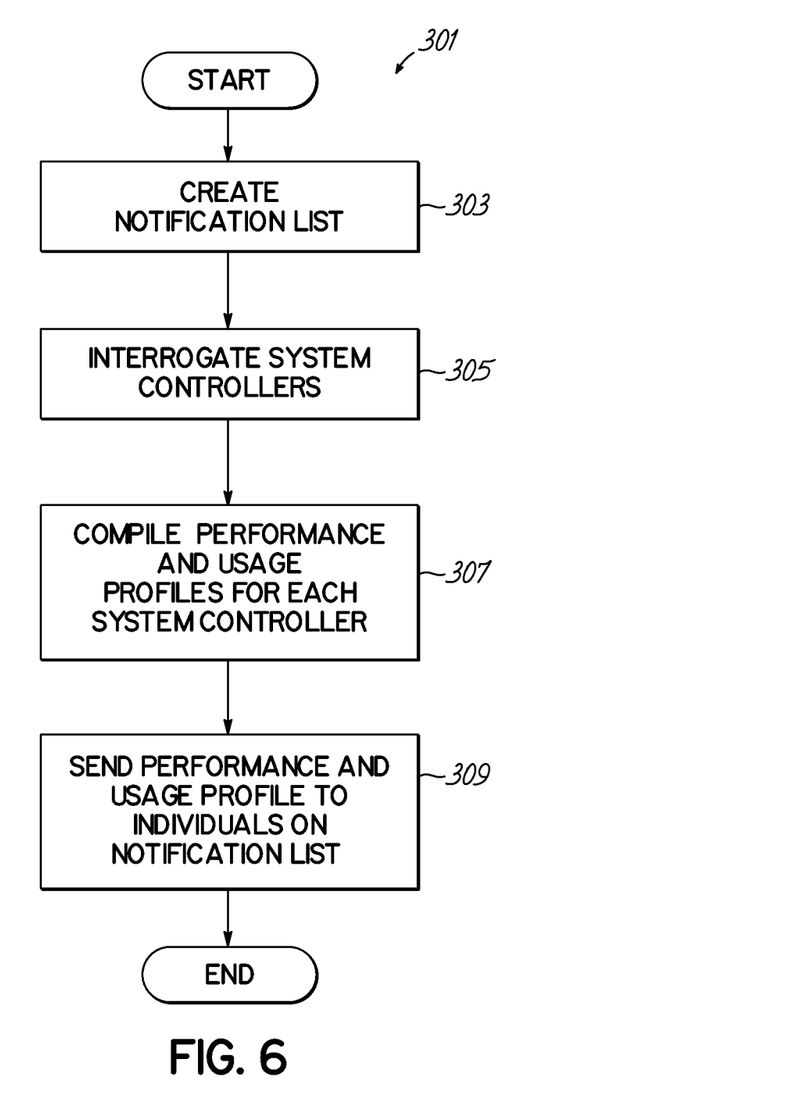
FIG. 6 is a flowchart of a notification process that may be performed by the mobile computing device and wireless interface module of FIG. 1.

Referring now to FIG. 6, an embodiment of the invention includes a process 301. Process 301 begins with a step 303, wherein a notification list is constructed. The notification list includes relevant contact information for individuals associated with or interested in the performance and usage of the underlying washing machines 13 and chemicals of chemical dispensing system 10. The notification list is programmable and updatable and may be created or updated by a user through mobile computing device 16 and transmitted to wireless interface module 12. After the notification list is created and/or updated, step 303 moves to a step 305. In step 305, wireless interface module 12 interrogates all of the system controllers 15 in communication with wireless interface module 12. Relevant information necessary to derive performance or usage information of system controllers 15, washing machines 13, and chemicals is collected and stored in wireless interface module 12. Thereafter step 305 proceeds to a step 307.

In step 307, wireless interface module 12 compiles the collected information into performance and usage profiles for each system controller 15, each washing machine 13, each chemical, or a combination thereof. Thereafter, step 307 proceeds to a step 309. In step 309, the performance and usage profiles compiled in step 307 is transmitted to the individuals on the notification list. For example, wireless interface module 12 may transmit via email the compiled profile information to each individual on the notification list. Thereafter, process 301 ends.

Figure 7:
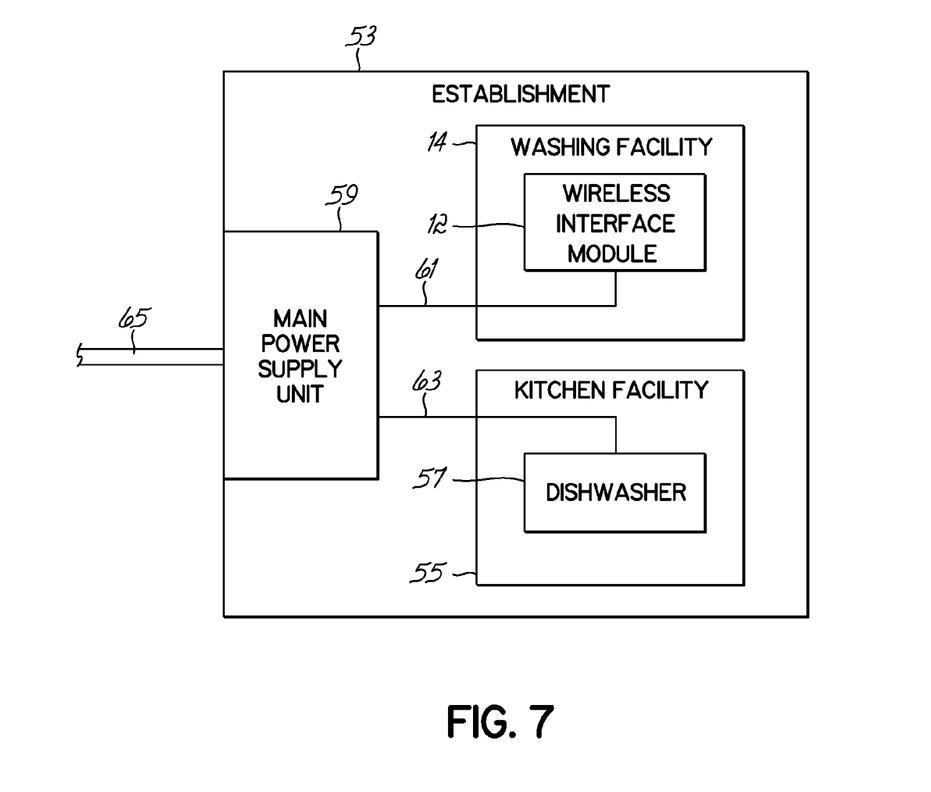
FIG. 7 is a graphical view of an exemplary architecture wherein the wireless interface module acts as a central communication hub to an establishment.

Referring now to FIG. 7, in an embodiment of the invention, wireless interface module 12 may be configured to act as a hub for multiple systems within an establishment 53. In addition to washing facility 14, establishment 53 may include another facility, for example a kitchen facility 55. Kitchen facility 55 may include a device such as a dish washer 57 or other similar elements or devices or controllers similar to system controller 15 associated with an underlying device. Dish washer 57 necessarily requires an amount of one or more particular chemicals as well as a supply of water. As such, wireless interface module 12 may be configured to poll dish washer 57 and communicate therewith to provide similar functionality with respect to system controllers 15. As such, wireless interface module 12 may retrieve usage and performance information, chemical threshold levels, and accumulated chemical data. Similarly, a user may request or be provided the collected information regarding dishwasher 57 on mobile computing device 16. Further, a user may provide updated system settings and transmit these settings to dishwasher 57 through wireless interface module 12.

Wireless interface module 12 may be configured to communicate with dish washer 57 or other elements within kitchen facility 55 through wireless communication and/or wired communication. In an embodiment of the invention, dishwasher may include a wireless module (not shown) similar to WiFi module 18 for wirelessly exchanging data with wireless interface module 12. In another embodiment of the invention, dishwasher 57 may transmit data through a direct data communication wire extending from dish washer 57 to wireless interface module 12. In yet another embodiment of the invention, wireless interface module 12 may be configured to communicate with wireless interface module 12 via power line communication (PLC) technology.

In this embodiment, a main power line 65 enters the establishment and is received in a main power supply unit 59 such as a circuit breaker box or terminal. A washing facility power line 61 extends from main power supply unit 59 to washing facility 14 to power wireless interface module 12. Similarly, a kitchen facility power line 63 extends from main power supply unit 59 to kitchen facility 55 to power dishwasher 57. As shown in FIG. 7, a channel exists between wireless interface module 12 and dish washer 57 through washing facility power line 61, main power supply unit 59, and kitchen facility power line 63. Wireless interface module 12 and dish washer 57 may communicate through this channel using PLC technology to transmit data therebetween and allow wireless interface module 12 to act as a central communication hub to various devices within establishment 53.

In this document, the terms "computer program storage medium" and "computer usable storage medium" are used to generally refer to storage media such as removable storage unit 814, removable storage unit 816, and a hard disk installed in hard disk drive 810. Computer program storage medium and computer usable storage medium may also refer to memories, such as main memory 806 and secondary memory 808, which may be semiconductor memories (e.g., DRAMS, etc.). Computer system 800 may further include a display unit 826 that interacts with communication infrastructure 804 via a display interface 828. Computer system 800 may further include a user input device 830 that interacts with communication infrastructure 804 via an input interface 832. A user input device 830 may include a mouse, trackball, touch screen, or the like.

Computer programs (also called computer control logic or computer program instructions) are stored in main memory 806 and/or secondary memory 808. Computer programs may also be received via communications interface 820. Such computer programs, when executed, enable computer system 800 to implement embodiments as discussed herein. In particular, the computer programs, when executed, enable processor 802 to implement the processes of embodiments of the invention, such as the stages in the method illustrated by flowchart 2800 of FIG. 28, discussed above. Accordingly, such computer programs represent controllers of the computer system 800. When an embodiment is implemented using software, the software may be stored in a computer program product and loaded into computer system 800 using removable storage drive 812, interface 818, and hard disk drive 810, or communications interface 820.

Embodiments may be implemented using software, hardware, and/or operating system implementations other than those described herein. Any software, hardware, and operating system implementations suitable for performing the functions described herein can be utilized. Embodiments are applicable to both a client and to a server or a combination of both.

In general, the routines executed to implement the embodiments of the invention, whether implemented as part of an operating system or a specific application, component, program, object, module or sequence of instructions, or even a subset thereof, may be referred to herein as "computer program code," "computer program instructions," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "comprising," or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method of managing a chemical dispensing system, the method comprising:
   associating a first system controller with a first washing device;
   connecting the first system controller indirectly to a wireless interface module through an intermediate system controller associated with a second washing device different from the first washing device;
   connecting the first washing device to the wireless interface module through the first system controller and the intermediate system controller;

assigning, by the wireless interface module, a first software address to the first system controller;
assigning, by the wireless interface module, a second software address to the intermediate system controller;
communicating, by the wireless interface module, to the first system controller via the first software address;
communicating, by the wireless interface module, to the intermediate system controller via the second software address;
communicating a first data wirelessly from a mobile computing device to the wireless interface module; and
communicating a second data from the wireless interface module to the first system controller in response to the wireless interface module receiving the first data.

2. The method of claim 1, further comprising sending or receiving data through a web browser application, through email, or through text messaging program.

3. The method of claim 1, further comprising:
providing a web browser application comprising a drop down menu of individual system controllers enabling a user to select a system controller and to view current operations and to change selective parameters associated with the selected system controller.

4. The method of claim 1, further comprising:
providing a user interface that receives user input regarding user settable chemical management inventory and threshold levels.

5. The method of claim 1, further comprising:
providing a web browser application including information regarding type and status of user connections and a visual indicator that provides a visual indication of connection quality.

6. The method of claim 1, wherein the second data is a second chemical formula, the method further comprising:
storing a first chemical formula in the first system controller; and
updating the first chemical formula with the second chemical formula in response to the first system controller receiving the second chemical formula from the wireless interface module.

7. The method of claim 6, further comprising:
creating, by the wireless interface module, a wireless local area network;
authenticating the mobile computing device for connecting to the wireless local area network;
when authenticated, connecting the mobile computing device to the wireless local area network; and
communicating the first data from the mobile computing device to the wireless interface module over the wireless local area network.

8. The method of claim 6, further comprising:
communicating a third data from the wireless interface module to the mobile computing device.

9. The method of claim 8, further comprising:
prior to communicating the third data from the wireless interface module to the mobile computing device, collecting, by the first system controller, the third data and communicating the third data from the first system controller to the wireless interface module.

10. A method of managing a chemical dispensing system, the method comprising:
connecting each of a plurality of system controllers to a wireless interface module to allow communication therebetween, each system controller being associated with a respective washing device in a plurality of washing devices;
communicating a first data wirelessly from a mobile computing device to the wireless interface module;
communicating a second data from the wireless interface module to a system controller of the plurality of system controllers in response to the wireless interface module receiving the first data;
setting a threshold value for a chemical, wherein the chemical is available to each washing device in the plurality of washing devices;
polling each system controller in the plurality of system controllers for a chemical usage amount for the chemical;
aggregating each chemical usage amount into a total chemical usage amount;
determining whether the total chemical usage amount is beyond the threshold value; and
in response to determining the total chemical usage amount is beyond the threshold value, ordering additional supply of the chemical, alerting an interested party, or both.

11. The method of claim 10, further comprising:
creating a notification list comprising contact information for a plurality of individuals;
interrogating, by the wireless interface module, a first system controller in the plurality of system controllers for profile data;
compiling, by the wireless interface module, a profile for a first washing device in the plurality of washing devices based at least in part on the profile data; and
communicating the profile to each individual in the notification list based on the contact information in the notification list.

12. The method of claim 10, further comprising:
determining an aggregate sum of all unconsumed chemicals within the system and an aggregate amount of chemicals consumed.

13. The method of claim 10, further comprising:
determining diagnostic information of all connected controllers, wherein the diagnostic information includes information regarding power failures.

14. A system for managing a chemical dispensing system, the system comprising:
one or more processors; and
a non-transitory computer readable storage medium having computer program instructions stored thereon that, when executed by at least one of the one or more processors, cause the system to:
associate a first system controller with a first washing device;
connect the first system controller indirectly to a wireless interface module through an intermediate system controller associated with a second washing device different from the first washing device;
connect the first washing device to the wireless interface module through the first system controller and the intermediate system controller;
assign, by the wireless interface module, a first software address to the first system controller;
assign, by the wireless interface module, a second software address to the intermediate system controller;
communicate, by the wireless interface module, to the first system controller via the first software address;
communicate, by the wireless interface module, to the intermediate system controller via the second software address;
communicate a first data wirelessly from a mobile computing device to the wireless interface module; and communicate a second data from the wireless interface module to the first system controller in response to the wireless interface module receiving the first data.

15. The system of claim 14, wherein the second data is a second chemical formula, the system further comprising computer program instructions that, when executed by the at least one processor, cause the system to:
store a first chemical formula in the first system controller; and
update the first chemical formula with the second chemical formula in response to the first system controller receiving the second chemical formula from the wireless interface module.

16. The system of claim 15, further comprising computer program instructions that, when executed by the at least one processor, cause the system to:
create, by the wireless interface module, a wireless local area network;
authenticate the mobile computing device for connecting to the wireless local area network;
when authenticated, connect the mobile computing device to the wireless local area network; and
communicate the first data from the mobile computing device to the wireless interface module over the wireless local area network.

17. The system of claim 14, further comprising computer program instructions that, when executed by the at least one processor, cause the system to:
communicate a third data from the wireless interface module to the mobile computing device.

18. The system of claim 17, further comprising computer program instructions that, when executed by the at least one processor, cause the system to:
prior to communication of the third data from the wireless interface module to the mobile computing device, collect, by the first system controller, the third data and communicate the third data from the first system controller to the wireless interface module.

19. The system of claim 14, wherein the controller is a non-serial controller and the system is configured to enable communication and connectivity of the controller by means of discrete port addressing without using software addressing.

20. The system of claim 19, further comprising a visual indicator that provides visual confirmation regarding connection status.

21. The system of claim 14, further comprising one or more sensors on a flush manifold output, wherein the one or more sensors are configured to provide dispenser control feedback and to provide product delivery verification information.

22. The system of claim 14, further comprising communication devices configured to provide multi-mode communication comprising at least one of wireless, wired, PLC, and mesh communication modes.

23. A system for managing a chemical dispensing system, the system comprising:
one or more processors; and
a non-transitory computer readable storage medium having computer program instructions stored thereon that, when executed by at least one of the one or more processors, cause the system to:
connect each of a plurality of system controllers to a wireless interface module, each system controller being associated with a respective washing device in a plurality of washing devices;
communicate a first data wirelessly from a mobile computing device to the wireless interface module;
communicate a second data from the wireless interface module to a system controller of the plurality of system controllers in response to the wireless interface module receiving the first data;
set a threshold value for a chemical, wherein the chemical is available to each washing device in the plurality of washing devices;
poll each system controller in the plurality of system controllers for a chemical usage amount for the chemical;
aggregate each chemical usage amount into a total chemical usage amount;
determine whether the total chemical usage amount is beyond the threshold value; and
in response to determining the total chemical usage amount is beyond the threshold value, order additional supply of the chemical, alerting an interested party, or both.

24. The system of claim 23, further comprising computer program instructions that, when executed by the at least one processor, cause the system to:
create a notification list comprising contact information for a plurality of individuals;
interrogate, by the wireless interface module, a first system controller in the plurality of system controllers for profile data;
compile, by the wireless interface module, a profile for a first washing device based at least in part on the profile data; and
communicate the profile to each individual in the notification list based on the contact information in the notification list.

25. A computer program product comprising
a non-transitory computer-readable storage medium; and
computer program instructions stored on the non-transitory computer-readable storage medium that, when executed by one or more processors, cause the one or more processors to:
associate a first system controller with a first washing device;
connect the first system controller indirectly to a wireless interface module through an intermediate system controller associated with a second washing device different from the first washing device;
connect the first washing device to the wireless interface module through the first system controller and the intermediate system controller;
assign, by the wireless interface module, a first software address to the first system controller;
assign, by the wireless interface module, a second software address to the intermediate system controller;
communicate, by the wireless interface module, to the first system controller via the first software address;
communicate, by the wireless interface module, to the intermediate system controller via the second software address;
communicate a first data wirelessly from a mobile computing device to the wireless interface module;
communicate a second data from the wireless interface module to the first system controller in response to the wireless interface module receiving the first data.

26. The computer program product of claim 25, wherein the second data is a second chemical formula, the computer program product further including instructions that, when executed by the one or more processors, cause the one or more processors to:
  store a first chemical formula in the first system controller; and
  update the first chemical formula with the second chemical formula in response to the first system controller receiving the second chemical formula from the wireless interface module.

27. The computer program product of claim 26, further comprising instructions that, when executed by the one or more processors, cause the one or more processors to:
  create, by the wireless interface module, a wireless local area network;
  authenticate the mobile computing device for connecting to the wireless local area network;
  when authenticated, connect the mobile computing device to the wireless local area network; and
  communicate the first data from the mobile computing device to the wireless interface module over the wireless local area network.

28. The computer program product of claim 25, further comprising instructions that, when executed by the one or more processors, cause the one or more processors to:
  communicate a third data from the wireless interface module to the mobile computing device.

29. The computer program product of claim 28, further comprising instructions that, when executed by the one or more processors, cause the one or more processors to:
  prior to communication of the third data from the wireless interface module to the mobile computing device, collect, by the first system controller, the third data and communicate the third data from the first system controller to the wireless interface module.

30. A computer program product comprising:
  a non-transitory computer-readable storage medium; and
  computer program instructions stored on the non-transitory computer-readable storage medium that, when executed by one or more processors, cause the one or more processor to:
    connect each of a plurality of system controllers to a wireless interface module, each system controller being associated with a respective washing device in a plurality of washing devices;
    communicate a first data wirelessly from a mobile computing device to the wireless interface module;
    communicate a second data from the wireless interface module to a system controller of the plurality of system controllers in response to the wireless interface module receiving the first data;
    set a threshold value for a chemical, wherein the chemical is available to each washing device in the plurality of washing devices;
    poll each system controller in the plurality of system controllers for a chemical usage amount for the chemical;
    aggregate each chemical usage amount into a total chemical usage amount;
    determine whether the total chemical usage amount is beyond the threshold value; and
    in response to determining the total chemical usage amount is beyond the threshold value, order additional supply of the chemical, alert an interested party, or both.

31. The computer program product of claim 30, further comprising instructions that, when executed by the one or more processors, cause the one or more processors to:
  create a notification list comprising contact information for a plurality of individuals;
  interrogate, by the wireless interface module, a first system controller in the plurality of system controllers for profile data;
  compile, by the wireless interface module, a profile for a first washing device of the plurality of washing devices based at least in part on the profile data; and
  communicate the profile to each individual in the notification list based on the contact information in the notification list.

* * * * *